May 12, 1964 C. P. KOLTHOFF, JR., ETAL 3,132,868
SHAFT SEAL
Filed Oct. 2, 1961
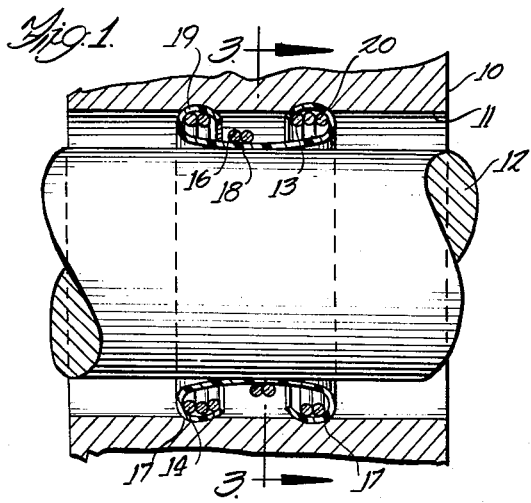
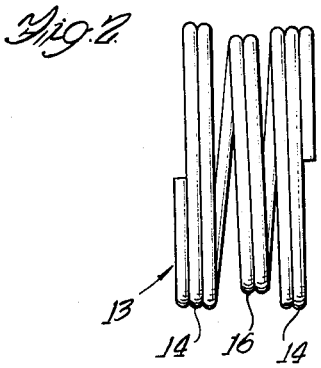
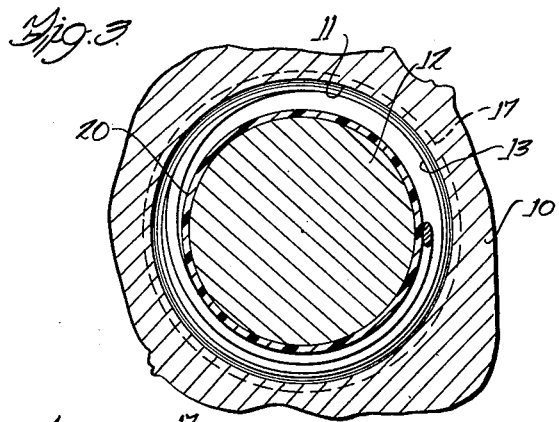
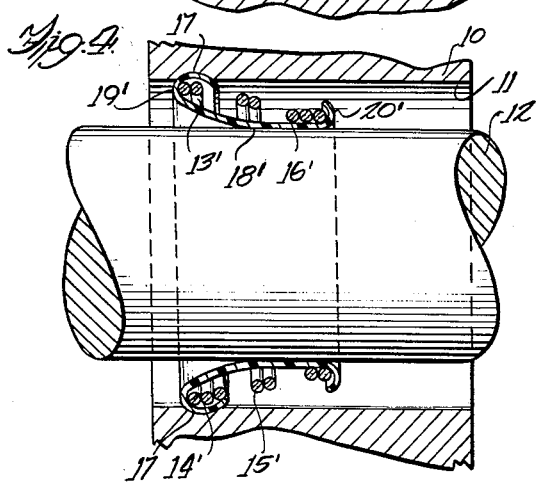
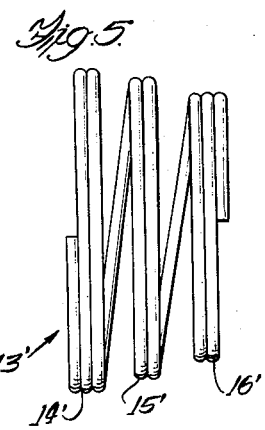
INVENTORS
C. PAUL KOLTHOFF, JR.
DAVID A. COBB
Paul O. Pippel
ATTORNEY United States Patent Office 3,132,868
Patented May 12, 1964

3,132,868
SHAFT SEAL
C. Paul Kolthoff, Jr., Naperville, and David A. Cobb, Riverdale, Ill., assignors to International Harvester Company, Chicago, Ill., a corporation of New Jersey
Filed Oct. 2, 1961, Ser. No. 142,378
2 Claims. (Cl. 277—153)

This invention relates to fluid seals, and more particularly to the type of seal which prevents fluids from flowing axially along a shaft through a clearance opening in a housing.

Prior art devices which have been used for this purpose have usually consisted of a plurality of parts, some of which were fitted onto the shaft, thus requiring extensive machining. Due to the use of a large number of parts, many prior art devices have proven to be difficult to assemble and reassemble, upon replacing broken or worn out parts. Other prior art devices contain specially molded resilient sealing elements, which necessitate a rather complicated and expensive manufacturing process. It is therefore the general purpose of this invention to provide a seal which has all the advantages of prior art devices, while being of simpler construction, thereby obviating manufacturing difficulties, and difficulties in assembling and reassembling the device.

It is a further object of the invention to provide an effective seal which contains only two working parts.

Another object of the invention is to provide a shaft seal with a self-lubricating sealing element.

Other objects and advantages will become more apparent from the following specification and drawings in which:

FIGURE 1 is a section view of one embodiment of the invention, and

FIGURE 2 is a detail view of the spring element of FIGURE 1, and

FIGURE 3 is a section view taken along line 3—3 of FIGURE 1, and

FIGURE 4 is a section view of another embodiment of the invention, and

FIGURE 5 is a detail view of the spring element of FIGURE 4.

Referring now more specifically to the drawings, reference numeral 10 indicates generally a housing having a bore 11 extending therethrough. Shaft 12 is rotatably mounted in bore 11 and is of such a sibe to allow a substantial amount of clearance between the periphery of the shaft and the wall of the bore.

The shaft seal is mounted in the clearance area between the shaft and the housing bore wall, and consists generally of a cylindrically shaped sleeve member 18 substantially surrounding a coil spring reinforcing element 13. In the embodiment shown in FIGURE 1 spring element 13 has end portions 14 of largest diameter, and central portion 16 of smallest diameter. Elastic sleeve element 18 is disposed within spring element 13, and has its end portions 19 and 20 stretched around end portions 14 of spring element 13. It will readily be appreciated that spring element 13, at its portion of smallest diameter 16, urges sleeve element 18 into sealing engagement with shaft 12, thereby preventing fluids from flowing at an area adjacent to the shaft. Sleeve end portions 19 and 20 are urged into sealing engagement with the wall of bore 11 by the end portions 14 of spring element 13, thereby preventing fluid from flowing at an area adjacent the bore wall.

Although it is not essential to the operation of the seal, in certain applications it may be desirable to provide means which locate the seal at a definite point within the housing. In such an application end portions 19 and 20 of sleeve 18 may be seated in a peripheral groove 17 in bore wall 11, thereby preventing the seal from moving axially in said housing.

In the embodiment illustrated in FIGURE 4, a modified form of reinforcing element 13' is shown. Reinforcing element 13' has an end portion 14' of largest diameter, a central portion 15' of intermediate diameter, and an end portion 16' of smallest diameter. Sleeve element 18' cooperates with spring element 13' in the same manner as in the embodiment shown in FIGURE 1, that is, end portions 19' and 20' of the sleeve are stretched over the coil spring element end portions 14' and 16' so as to form a lip substantially enveloping said coil end portions. This embodiment provides for a more flexible seal, because coil portion 14' of largest diameter is axially spaced farther from coil portion 16' of smallest diameter than in the embodiment illustrated in FIGURE 1. In order to provide for an even greater amount of flexibility, the individual turns of intermediate coil portion 15' may be spaced apart from one another, rather than being closely adjacent or touching, as is shown in FIGURE 5.

Sleeve members 18 and 18' are formed preferably of a self-lubricating thermoplastic material, such as nylon or "Teflon" (trademark owned by E. I. Du Pont de Nemours and Company). The self-lubricating characteristics of polyamid materials such as nylon, are well known in the art. The "Teflon" resins are believed to be of the polytetrafluoroethylene type described in U.S. Patent #2,230,654 to R. J. Plunkett. A particularly desirable feature of the present invention is that sleeve member 18 may be formed from a length of tubing, obviating the necessity of forming the sealing element from a special molding, as was required in prior art seals. The invention also contemplates the use of other well known resilient oil resistant materials, such as, neoprene or the like.

Operation of the shaft seal should be clearly understood from the foregoing description. It should likewise be understood that the invention has been described in its preferred embodiments only, and that modifications may be made therein without departing from the spirit of the invention or the scope of the appended claims.

What is claimed is:

1. In a fluid seal of the type including a housing having a circular opening formed therein and a rotatable shaft extending through said opening, wherein the improvement comprises;

a flexible coupling for preventing passage of fluid between the shaft and opening but permitting relative movement therebetween including, an elongated coil spring the end portions of which are of a larger diameter than the diameter of said circular opening, said elongated coil spring having a central portion located between said end portions and being of smaller diameter than said end portions, an elastic generally cylindrically shaped sleeve member having an unstressed diameter smaller than the diameter of said circular opening formed in said housing, said sleeve member being disposed within said elongated coil spring and having its end portions stretched over said end potrions of said coil spring forming lips enveloping said coil spring, said end portions of said coil spring being positioned to urge said lips into sealing engagement with the circular opening in said housing and said central section of said coil spring being positioned to urge said sleeve into sealing engagement with said shaft.

2. The improvement as set forth in claim 1 wherein said circular opening formed in the housing includes grooves forming seats for said flexible coupling to prevent axial movement within said circular opening.

References Cited in the file of this patent
UNITED STATES PATENTS

| | | |
|---|---|---|
| 2,580,546 | Hobson | Jan. 1, 1952 |
| 2,744,772 | Amirault et al. | May 8, 1956 |

FOREIGN PATENTS

| | | |
|---|---|---|
| 923,534 | France | Feb. 17, 1947 |